United States Patent
Jalkanen et al.

(10) Patent No.: US 12,223,836 B2
(45) Date of Patent: Feb. 11, 2025

(54) METHOD AND AN APPARATUS IN A SYSTEM FOR ANALYSIS OF INFORMATION RELATED TO AN ACCIDENT OF A VEHICLE

(71) Applicant: Telia Company AB, Solna (SE)

(72) Inventors: Tero Jalkanen, Tuusula (FI); Tomi Sarajisto, Helsinki (FI)

(73) Assignee: Telia Company AB (SE)

( * ) Notice: Subject to any disclaimer, the term of this patent is extended or adjusted under 35 U.S.C. 154(b) by 150 days.

(21) Appl. No.: 18/080,047

(22) Filed: Dec. 13, 2022

(65) Prior Publication Data
US 2023/0206766 A1 Jun. 29, 2023

(30) Foreign Application Priority Data
Dec. 28, 2021 (SE) .................................... 2151627-3

(51) Int. Cl.
*G08G 1/16* (2006.01)
*H04W 4/40* (2018.01)

(52) U.S. Cl.
CPC ............ *G08G 1/164* (2013.01); *H04W 4/40* (2018.02)

(58) Field of Classification Search
None
See application file for complete search history.

(56) References Cited

U.S. PATENT DOCUMENTS

| | | |
|---|---|---|
| 2016/0086391 A1* | 3/2016 | Ricci .................. G07C 5/08 701/29.3 |
| 2016/0148512 A1* | 5/2016 | Menouar ............ H04W 4/023 340/989 |
| 2016/0277911 A1 | 9/2016 | Kang et al. |
| 2019/0288917 A1 | 9/2019 | Ricci |
| 2020/0307480 A1 | 10/2020 | Troia et al. |
| 2020/0312046 A1* | 10/2020 | Righi .................. G07C 5/008 |

(Continued)

FOREIGN PATENT DOCUMENTS

| | | |
|---|---|---|
| EP | 3076689 A1 | 5/2016 |
| WO | WO 2014/203043 A1 | 12/2014 |
| WO | WO 2021/098967 A1 | 5/2021 |

OTHER PUBLICATIONS

Swedish Search Report dated Jun. 29, 2022, for Swedish Patent Application No. 2151627-3, Swedish Patent and Registration Office.

(Continued)

*Primary Examiner* — Thomas S McCormack
(74) *Attorney, Agent, or Firm* — Burr & Forman LLP

(57) ABSTRACT

The present embodiments relate to a method in a system, a method in a network device, and a network device. The method includes: acquiring, from an entity, a notification of the occurrence of an accident of a vehicle in an area; requesting a RAN node and a CN node of the mobile operator to provide information regarding the vehicle; receiving from the CN node a combined information including information regarding communication with the vehicle and/or information of interest in said area provided to the core network node from vehicles and/or users, and/or devices present in said area where the accident occurred, and available information regarding the vehicle; and analyzing the received combined information.

18 Claims, 5 Drawing Sheets

(56) References Cited

U.S. PATENT DOCUMENTS

2020/0365008 A1 11/2020 Sjolund et al.
2021/0217292 A1 7/2021 Dobkins

OTHER PUBLICATIONS

ETSI TS 123501 V16.6.0, Oct. 2020, Technical Specification, 5G; System Architecture for the 5G System (5GS) (3GPP TS 23.501 version 16.6.0 Release 16.
European Search Report dated Apr. 18, 3023, for European Patent Application No. 22211551.1, European Patent Office, Munich Germany.
Strategy Analytics, Service Providers Leverage Network Functionality to Expand 5G Value Plane with NEF and NWDAF, Sep. 3, 2021, pp. 1-22.
Input Contribution Use Case "Traffic Accident Information Collection" Apr. 3, 2013, oneM2M Partners, pp. 1-6.

* cited by examiner

METHOD AND AN APPARATUS IN A SYSTEM FOR ANALYSIS OF INFORMATION RELATED TO AN ACCIDENT OF A VEHICLE

TECHNICAL FIELD

The present disclosure relates to the field of wireless data communications, and in particular to a method in a system, a method in an apparatus, and an apparatus in terms of a network device for gathering and analyzing information data related to an accident of a vehicle in said system.

BACKGROUND

V2X (vehicle-to-everything) protocols involve communication between a vehicle and an entity that may affect, or may be affected by the vehicle. It is a vehicle communication system that incorporates other more specific types of wireless communication protocols such as V2I (vehicle-to-infrastructure), V2V (vehicle-to-vehicle), V2P (vehicle-to-pedestrian), V2N (vehicle-to-network), etc. The main purposes for V2X are road safety, traffic efficiency in terms of congestion in traffic and energy savings. Hence, V2X and specifically V2V communication technology can increase the performance of vehicle safety systems and help save lives. Unfortunately, vehicle accidents still occur, and when these occur, it is important that reliable information is gathered for investigation and analysis and for increasing further safety and reduce the number of incidents. This is important when partial/full self-driving vehicles and other autonomous vehicles are now introduced in roads across the globe. There is therefore an ever-increasing need to find a mechanism that allows parties (e.g., a law enforcement agency and/or an insurance company and/or a vehicle manufacturer) to analyze accidents and the data related to accidents to determine what happened, in a similar manner to how a black box is analyzed after an airplane crashes.

Compared to airplanes, a typical autonomous vehicle or a V2V-capable vehicle uses much more exchange of signaling and other data between it and the environment such as other vehicles, pedestrians, and roadside equipment nearby as well as various services accessed through the mobile network. Therefore a mobile operator could play a crucial role in assisting those accident analysts by offering a single point of contact for all the relevant info.

There are however drawbacks when gathering information. For example, some relevant information can be accidently bypassed, as analysts might not have knowledge of all the various places/databases where information could be fetched. Further, a physical black box in the device (or vehicle), creates additional cost/weight for the vehicle which in some cases is not feasible and also such a physical box can be damaged making it hard to re-construct the data related to the accident.

SUMMARY

It is therefore an object of embodiments herein to solve the above problem by providing a method in a communication system, a method in an apparatus and an apparatus for gathering information related to an accident in a secure and reliable way in order to offload complex functionality of collecting all kinds of data and maintaining them from the device(s) into the network, meaning that the gathering of the information is provided in a network device of a mobile operator, which device itself would be secure, more simple, and cheaper.

According to an aspect of embodiments herein, there is a method in a system comprising a network of a mobile operator, one or more entities, and one or more vehicles configured to communicate with the network of the mobile operator; the method comprising: a network device of the mobile operator, acquiring from an entity, a notification of the occurrence of an accident of a vehicle in an area; the network device, requesting a radio access network (RAN) node and a core network (CN) node of the mobile operator to provide information regarding the vehicle; the core network node determining which vehicles and/or users, and/or devices are present in said area where the accident occurred; the core network node requesting the vehicles and/or users and/or devices to provide information regarding communication with the vehicle and/or information of interest in said area; the core network node acquiring the requested information;

the core network node combining the acquired information and available information regarding the vehicle; and the core network node sending the combined information to the network device for enabling the network device to analyze the combined information.

There is also provided a method performed by the network device of the mobile operator according to the subject matter disclosed herein.

There is also provided a network device comprising a processor and a memory containing instructions executable by the processor whereby the network device is configured to perform the subject matter disclosed herein.

An advantage of an embodiment herein is to provide a method in a communication system, a method in a network device and, an network device for gathering information related to an accident in a secure and reliable way in order to offload complex functionality of collecting all kinds of data and maintaining them from the device(s) into the network, meaning that the gathering of the information is provided in a network device of a mobile operator, which network device itself would be secure, more simple and cheaper.

Additional advantages achieved by the embodiments herein will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Figure 1:
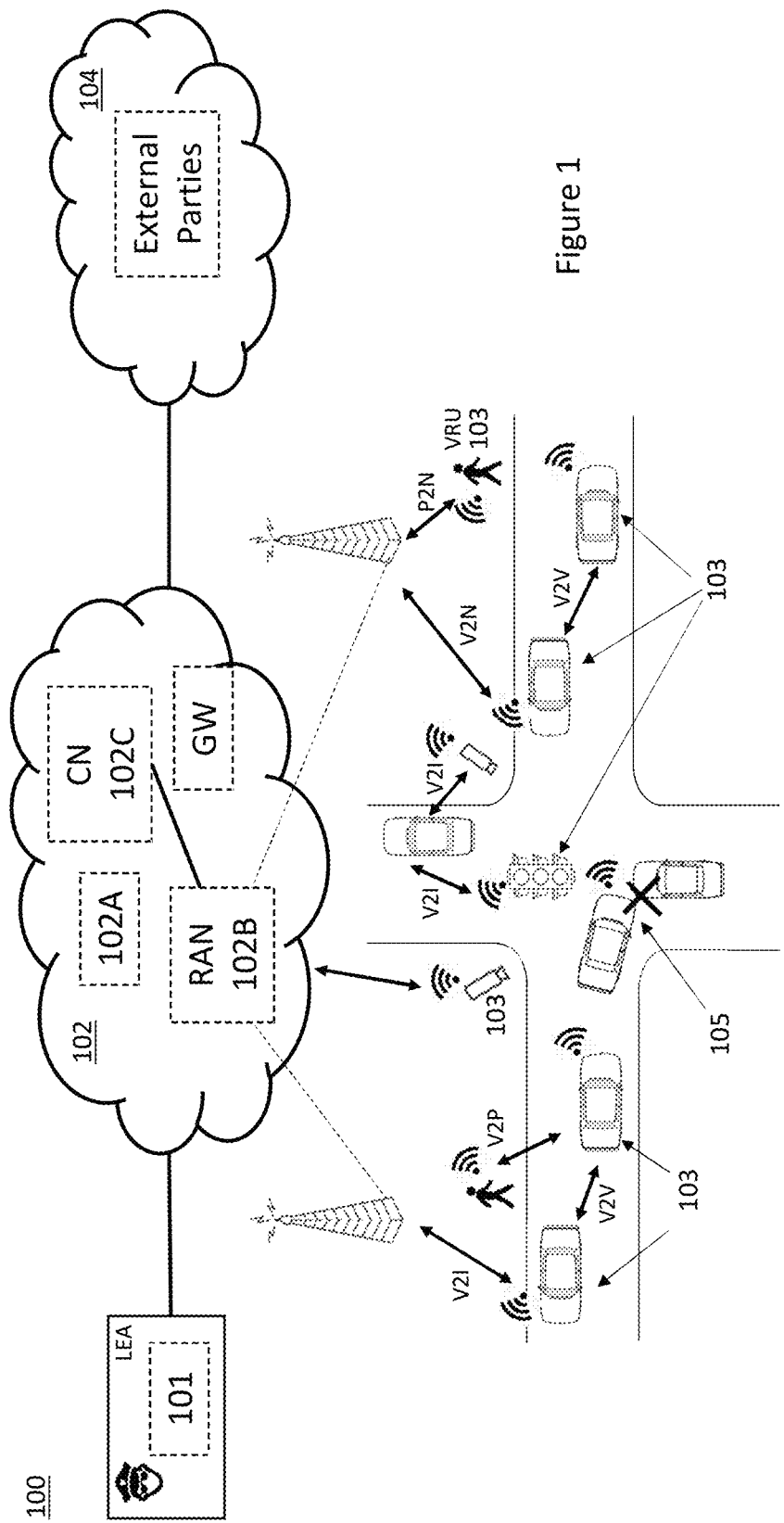
FIG. 1 is an example of a system employing different technologies for communications and different parties, wherein embodiments herein may be employed.

Referring to FIG. 1, there is illustrated a system employing different V2X technologies for communications involving vehicles, pedestrians, a mobile operator, a core network, a radio access network, radio base stations, traffic lights, cameras, external parties, a law enforcement authority, or agency, etc., wherein embodiments herein may be employed.

Figure 2:
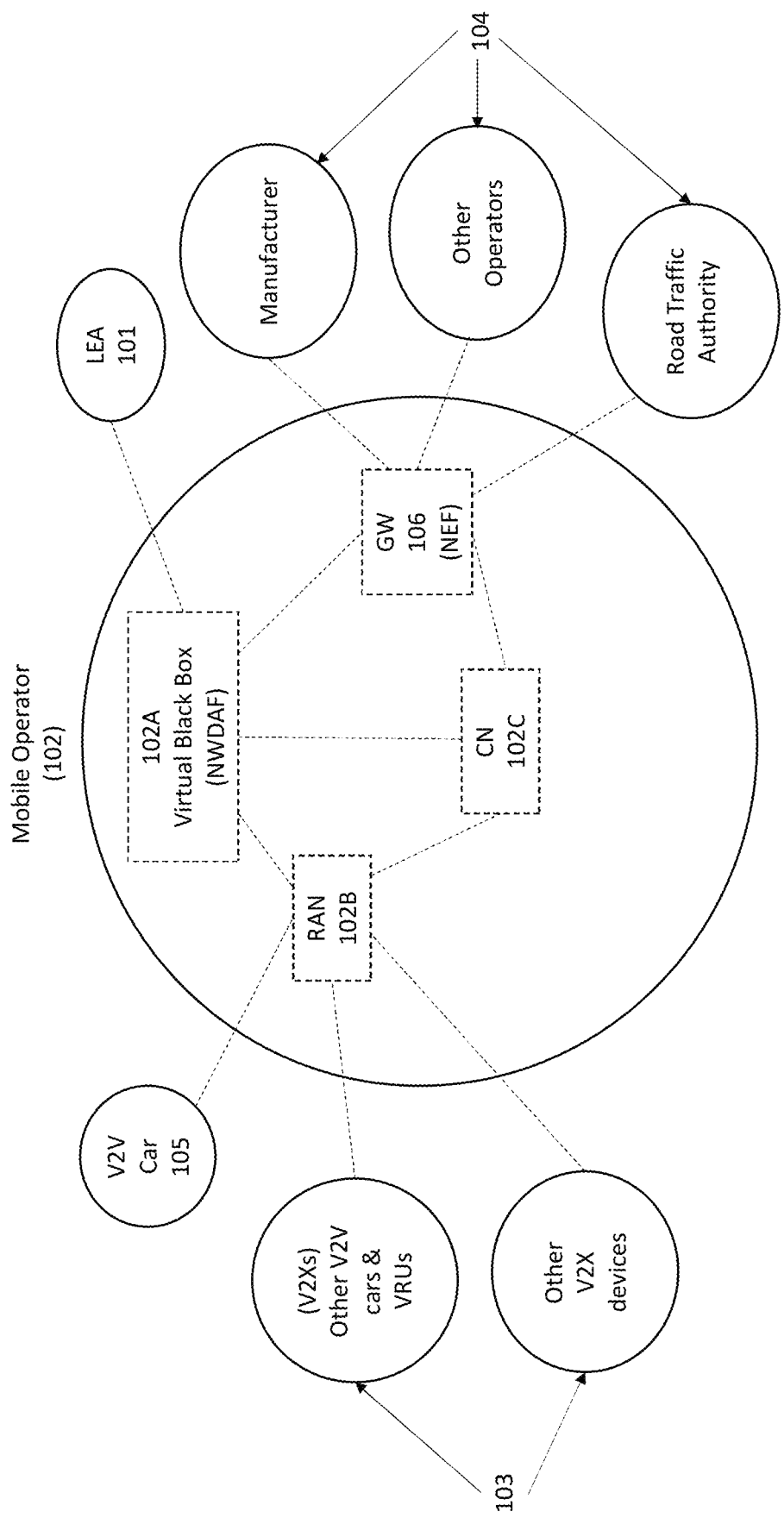
FIG. 2 illustrates another simplified system wherein embodiments herein may be employed.

As shown, vehicles 103 can communicate with each other using V2V technology, pedestrians 103 can communicate with vehicles using V2P technology, cameras 103 can communicate with vehicles using V2I technology, vehicles can communicate with the network operator 102 using V2N technology. Pedestrians may also communicate with the network using P2N (person-to-network) technology. A pedestrian or a person may be referred to as a VRU (vulnerable road user). The mobile network 102 is shown including a radio access network (RAN) including at least one RAN node 102B, a core network (CN) including at least one CN node 102B, a gateway (GW) which may communicate with external parties 104, and a law enforcement authority including at least one entity 101 which may communicate with the mobile operator 102. The system also shows mobile base stations (eNodeBs or gNBs) which are part of the RAN. Examples of external parties 104 may include other (mobile) operator(s), vehicle manufacturer(s), road traffic authority, insurance companies, etc. as shown in FIG. 2.

According to embodiments herein, there is provided a network device 102A in the network of the mobile operator 102, which is configured to acquire or collect information related to an accident that occurs in an area. The network device 102A may be viewed as a virtual black box which, as will be explained is configured, to gather, collect or acquire information and analyze said information in a centralized manner. FIG. 2 illustrates the network device 102A in the form of a virtual black box in the network of the mobile operator 102. The RAN (node) 102B and the core network (node) 102C may belong to any radio access technology such as 3G, 4G, 5G, WiMAx, etc.

Figure 3:
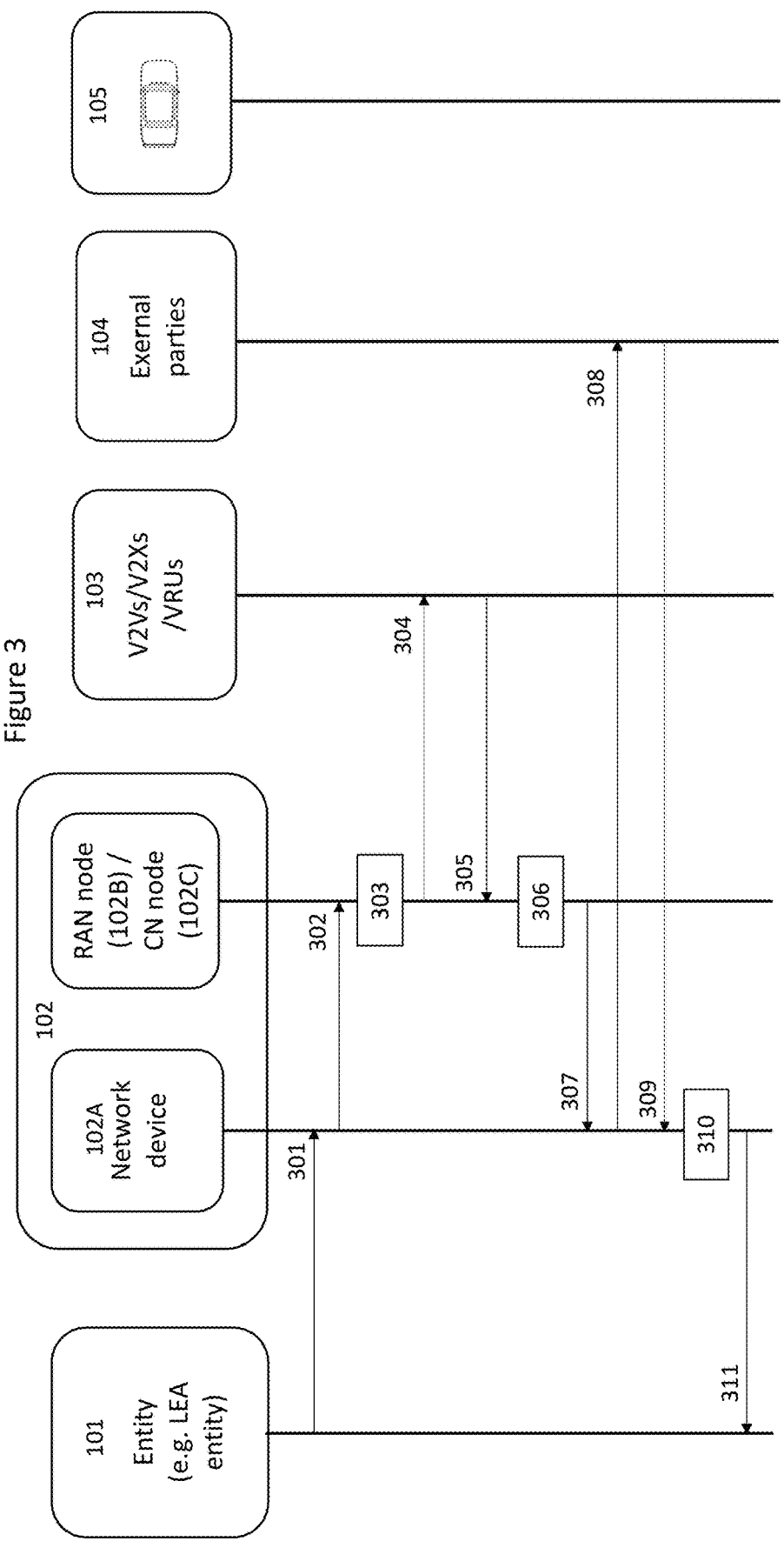
FIG. 3 is a signaling diagram employing some of the embodiments herein.

FIG. 3 illustrates a signaling diagram wherein embodiments herein may be applied. Assuming that a vehicle accident occurs in an area. This is shown in FIG. 1, where vehicle 105 being a V2V-capable vehicle is involved. Vehicle 105 may be a partial/full self-drinving vehicle and/or an autonomous vehicle.

The following signaling may be employed, in accordance with some embodiments:

301 The network device 102A (or virtual black box) of the operator network 102 acquires from an entity 101, such as a law enforcement authority (LEA) (e.g., the police), a notification of the occurrence of an accident of a vehicle 105 in the area. A LI ("law interception" or "lawful interception") interface defined in existing 2G/3G/4G/5G networks may be used to provide means to access signaling to/from the law enforcement agency entity 101 and the network device 102A. The network operator 102 may provide an API (application programming interface) towards the law enforcement agency entity 101 enabling the entity to fetch signaling and other relevant data belonging to the vehicle 105. The LEA entity 101 is assumed to receive information that the accident occurred from vehicle 105, from a VRU, from another vehicle or from any party.

The network device 102A may be a standalone node/service in the mobile operator core network or RAN or it can be a logical extension to network data analytics function node, such as (NWDAF) in 5G SA (standalone) core. The network device 102A may include the NWDAF.

302 The network device 102A requests the RAN node 102B and the CN node 102C of the mobile operator 102 information regarding the vehicle 105 involved in the accident. For example, the information may include traffic log information of the vehicle which comprises one or more of the following: location information, call information, information on data consumed in or by the vehicle 105; information on network services used in or for the vehicle 105, status of operation of one or more pieces of equipment of the vehicle 105, time of the occurrence of the accident, etc.

303 The core network node 120C determines or analyzes which vehicles (V2Vs) and/or users (VRUs) 103 and/or other devices (V2X) were present in the area where the accident occurred.

304 The core network node 120C may also request the vehicles (V2Vs) and/or users (VRUs) 103 and/or other devices (V2X) to provide information regarding (V2X) communication with the vehicle 105 and/or information of interest in the area.

305 The core network node 120C acquires the information requested in step 304.

306 The core network node 120C combines the acquired information and available information or data regarding vehicle 105. For example, network usage such as calls to/from it before the accident and sends the data to the network device 102A.

307 The network device 102A receives the combined information from the core network node for enabling the network node 102A to analyze it.

308 According to an embodiment, the network device 102A also sends a request to the one or more external parties 104 to provide information on the vehicle 105.

309 The network device 120A acquires the information from the external parties 104 for analyzing all acquired information 310. The information may include information relating to one or more of the following: traffic conditions, weather in the area, manufacturing data of the vehicle 105. For example a manufacturer of vehicle 105 is requested to provide maintenance/logistics data, road authority may provide road condition and weather related information and other local network operators may be requested to provide additional data.

311 The network device 120A then sends all the information including the analyzed information to the entity 101. Hence, the result of the analysis of the combined information and the result of the analysis of the acquired information from the one or more external parties 104 are transmitted to the entity 101.

According to an embodiment, the network device 102A acquires the information from the external parties via a network exposure function (NEF) acting as a gateway in the mobile operator network 102. An advantage of having a NEF is that the NEF provides a secure and speedy access to device information (e.g., Internet-of-Things (IoT) control) and management of APIs in a single robust dedicated API gateway. The NEF may be part of the 5G SA core. The network device 102A may comprise the NWDAF for analyzing the acquired information.

By means of the network device 102A, the network operator 102 acts as a "central scrutinizer" collecting information for the network device 102A, combining historical traffic log information it receives via its own RAN and CN related to vehicle 105, information from other devices 103, and information from external parties 104.

For example, if an operator is tasked by the police or a law enforcement agency to be the main point of contact for all this kind of accidents, then other operators would be automatically requested to provide all relevant information to the operator acting as the "central scrutinizer".

The operator may, with the help of artificial intelligence (AI), acquire information from Big Data database(s), combining it with the information from the other sources discussed above and provide the police with the full analysis via the network device 120A (e.g., as a virtual black box service).

Figure 4:
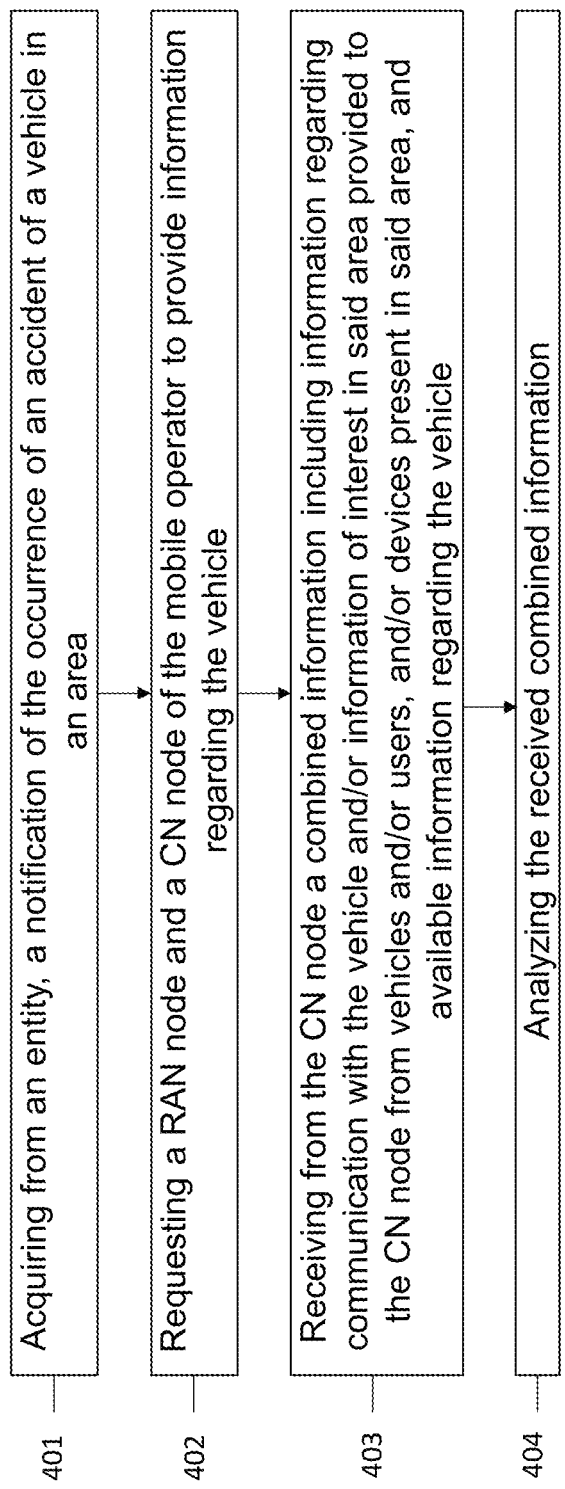
FIG. 4 is a flowchart of a method performed by a network device according to some embodiments.

Referring to FIG. 4, there is illustrated a flowchart of a method performed by the network device 102A in the system according to embodiments herein. The method comprising:

401—Acquiring from an entity 101, a notification of the occurrence of an accident of a vehicle 105 in an area;

402—Requesting a radio access network node 102B and a core network node 102C of the mobile operator 102 to provide information regarding the vehicle 105;

403—Receiving from the core network node 102C a combined information including information regarding communication with the vehicle 105 and/or information of interest in said area provided to the core network node 102C from vehicles and/or users, and/or devices 103 present in said area where the accident occurred, and available information regarding the vehicle 105; and 404—analyzing the received combined information.

As previously described, the method further comprises, the network device 102A sending a request to one or more external parties 104 to provide available information on the vehicle 105;

and acquiring available information on the vehicle 105 from said one or more external parties 104. The method further comprises analyzing the acquired information and sending 311 to the entity 101, the result of the analysis of the combined information and the result of the analysis of the acquired information from the one or more external parties 104.

The network device 102A acquires the notification from the entity 101 via an API or via a LI (lawful interception) interface of the mobile operator 102, and sends the information to the entity 101 via an API or via the LI interface of the mobile operator 102. The information from the external parties is acquired via a Network Exposure Function (NEF) of the mobile operator 102, which NEF acts as a gateway as previously described. The network device 102A may comprise a Network Data Analytics Function (NWDAF) for analyzing the acquired information.

Figure 5:
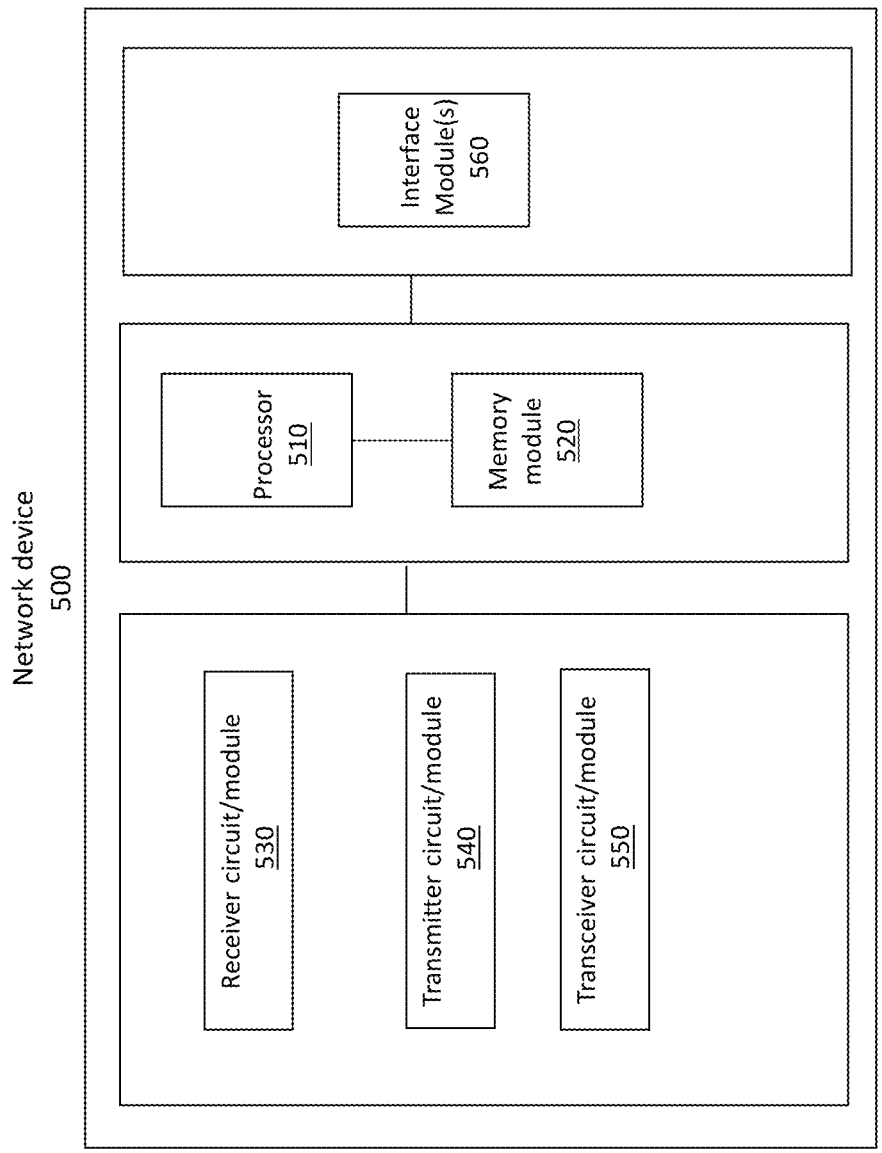
FIG. 5 depicts a simplified block diagram of an exemplary network device according to an embodiment.

Referring to FIG. 5, there is illustrated an example of a network device 102A 500 according to some exemplary embodiments herein.

The network device 500, acting as a virtual black box, comprises a processing circuit or a processing module or a processor 510; a memory module 520; a receiver circuit or receiver module 530; a transmitter circuit or transmitted module 540; and a transceiver circuit or transceiver module 550 which may include the transmitter circuit 530 and the receiver circuit 530.

The device 500 may support any radio access technology including 4G, 5G, Wifi, Bluetooth, Wimax or a combination thereof. The device 500 being in the network of the mobile operator is configured to communicate using interfaces, as previously described. The network device 500 is shown provided with interface module(s) 560. The device 500 may also communicate using a plurality of protocols including V2X protocol, Wifi, Bluetooth, etc. The network device 500 may use different protocols and be provided with a global positioning system (GPS).

The processing module/circuit 510 includes a processor, microprocessor, an application specific integrated circuit (ASIC), field programmable gate array (FPGA), or the like, and may be referred to as the "processor 510." The processor 510 controls the operation of the device 500 and its components. Memory (circuit or module) 520 includes a random-access memory (RAM), a read only memory (ROM), and/or another type of memory to store data and instructions that may be used by processor 510. In general, it will be understood that the device 500 in one or more embodiments includes fixed or programmed circuitry that is configured to carry out the operations in any of the embodiments disclosed herein.

The processor 510 is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 510 to carry out the operations of the device 500 disclosed herein. Further, it will be appreciated that the device 500 may comprise additional components not shown in FIG. 5. The network device 500 may be integrated with any suitable network part of the mobile operator, such as in the RAN, or the CN or the GW or any suitable network node. The network device 500 may be a standalone device in the network of the mobile operator. The network device 500 may be provided with a NWDAF for analyzing the acquired information as previously described.

The network device 500 is configured to perform any one of the subject-matter of the appended method claims related to the network device 500.

As previously described, the network device 500 is configured to: acquire, from an entity, a notification of the occurrence of an accident of a vehicle in an area; request a RAN node and a CN node of the mobile operator to provide information regarding the vehicle. The network device 500 is further configured to receive from the CN node a combined information including information regarding communication with the vehicle and/or information of interest in said area provided to the CN node from vehicles and/or users, and/or devices present in said area where the accident occurred, and available information regarding the vehicle. The network device 500 is further configured to analyze the received combined information.

The network device 500 is further configured to send a request to one or more external parties to provide available information on the vehicle; and to acquire available information on the vehicle (from said one or more external parties). The network device 500 is also configured to analyze the acquired information and send to the entity, the result of the analysis of the combined information and the result of the analysis of the acquired information from the one or more external parties.

As previously presented, the network device 500 is configured to acquire the notification from the entity via an API or via a LI interface of the mobile network, and to send the information to the entity via an API or via the LI interface of the mobile network. The information from the external parties is acquired via a Network Exposure Function (NEF) of the mobile operator.

Additional details of the present disclosure have already been described and need to be repeated.

There is also provided a computer program comprising instructions which when executed on at least one processor 510 of the network device 500 according to embodiments herein, cause the at least one processor 510 to carry out the method previously described. Also, a carrier containing the computer program is provided, wherein the carrier is one of a computer readable storage medium; an electronic signal, optical signal, or a radio signal.

As clear from the described embodiment, an advantage herein is to provide a method in a communication system, a method in a network device and, an network device for gathering information related to an accident in a secure and reliable way in order to offload complex functionality of collecting all kinds of data and maintaining them from the device(s) into the network, meaning that the gathering of the information is provided in a network device of a mobile operator, which network device itself would be secure, more simple and cheaper.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, the embodiments herein may be applicable in any wireless systems, including 4G, 5G involving V2X technology, D2D (device-to-device) technology etc.

The invention claimed is:

1. A method in a system comprising a network of a mobile operator, one or more entities, and one or more vehicles configured to communicate with the network of the mobile operator, the method comprising:
   a network device of the mobile operator acquiring from an entity a notification of the occurrence of an accident of a vehicle in an area;
   the network device requesting a radio access network (RAN) node and a core network (CN) node of the mobile operator to provide information regarding the vehicle;
   the core network node determining which vehicles and/or users, and/or devices are present in said area where the accident occurred;
   the core network node requesting the vehicles and/or users and/or devices to provide information regarding communication with the vehicle and/or information of interest in said area;
   the core network node acquiring the requested information;
   the core network node combining the acquired information and available information regarding the vehicle; and
   the core network node sending the combined information to the network device for enabling the network device to analyze the combined information.

2. The method according to claim 1, further comprising the network device sending a request to one or more external parties to provide the available information on the vehicle, and the network device acquiring the available information on the vehicle from said one or more external parties.

3. The method according to claim 2, further comprising the network device analyzing the acquired information and sending to the entity the result of the analysis of the combined information and the result of the analysis of the acquired information from the one or more external parties.

4. The method according to claim 2, wherein the information to the network device from the one or more external parties is acquired via a Network Exposure Function (NEF) of the mobile operator.

5. The method according to claim 1, wherein the network device comprises a Network Data Analytics Function (NWDAF) for analyzing the acquired information.

6. The method according to claim 1, wherein the information regarding the vehicle acquired from the radio access network node and the core network node includes traffic log information of the vehicle which comprises one or more of the following: location information, call information, information on data consumed in or by the vehicle, information on network services used in or for the vehicle, and status of operation of one or more pieces of equipment of the vehicle.

7. The method according to claim 1, wherein the information provided by the vehicles, being V2V-capable vehicles, includes V2V-communication information with the vehicle.

8. The method according to claim 1, wherein the information provided by the devices, being V2X-capable devices, includes information relating to one or more of the following: roadside traffic cameras, information booth, traffic lights, and traffic conditions.

9. The method according to claim 2, wherein the information acquired from the one or more external parties includes information relating to one or more of the following: traffic conditions, weather in the area, and manufacturing data of the vehicle.

10. The method according to claim 1, further comprising the network device acquiring the notification from the entity via an Application Programming Interface (API) or via a Lawful Intercept (LI) interface of the mobile network.

11. The method according to claim 1, further comprising the network device sending the information to the entity via an Application Programming Interface (API) or via a Lawful Intercept (LI) interface of the mobile network.

12. A method performed by a network device in a system comprising a network of a mobile operator, one or more entities, and one or more vehicles configured to communicate with the network of the mobile operator, the method comprising:
   acquiring, from an entity, a notification of the occurrence of an accident of a vehicle in an area;
   requesting a radio access network (RAN) node and a core network (CN) node of the mobile operator to provide information regarding the vehicle;
   receiving from the CN node a combined information including information regarding communication with the vehicle and/or information of interest in said area provided to the CN node from vehicles and/or users, and/or devices present in said area where the accident occurred, and available information regarding the vehicle; and
   analyzing the received combined information.

13. The method according to claim 12, further comprising sending a request to one or more external parties to provide available information on the vehicle, and acquiring available information on the vehicle from said one or more external parties.

14. The method according to claim 13, further comprising analyzing the acquired information and sending to the entity, the result of the analysis of the combined information and the result of the analysis of the acquired information from the one or more external parties.

15. The method according to claim 12, further comprising acquiring the notification from the entity via an Application Programming Interface (API) or via a Lawful Intercept (LI) interface of the mobile network and sending the information to the entity via the API or via the LI interface of the mobile network.

16. The method according to claim 13, wherein the information from the one or more external parties is acquired via a Network Exposure Function (NEF) of the mobile operator.

17. The method according to claim 12, wherein the network device comprises a Network Data Analytics Function (NWDAF) for analyzing the acquired information.

18. A network device comprising a processor and a memory containing instructions executable by the processor whereby the network device is configured to:
- acquire from an entity, a notification of the occurrence of an accident of a vehicle in an area;
- request a radio access network (RAN) node and a core network (CN) node of the mobile operator to provide information regarding the vehicle;
- receive from the CN node a combined information including information regarding communication with the vehicle and/or information of interest in said area provided to the CN node from vehicles and/or users, and/or devices present in said area where the accident occurred, and available information regarding the vehicle; and
- analyze the received combined information.

* * * * *